S. BIGELOW & L. C. BIGELOW.
Potato-Diggers.

No. 138,470. Patented May 6, 1873.

Witnesses.
A. J. Cornell.
N. North

Inventor.
S. and L. C. Bigelow.
Geo. Burridge & Co.
Attys.

AM. PHOTO-LITHOGRAPHIC CO. N.Y. (OSBORNE'S PROCESS.)

UNITED STATES PATENT OFFICE.

SILAS BIGELOW, OF NEWBURG, AND LEANDER C. BIGELOW, OF KIRTLAND, OHIO.

IMPROVEMENT IN POTATO-DIGGERS.

Specification forming part of Letters Patent No. 138,470, dated May 6, 1873; application filed January 8, 1873.

*To all whom it may concern:*

Be it known that we, SILAS BIGELOW, of Newburg, in the county of Cuyahoga and State of Ohio, and LEANDER C. BIGELOW, of Kirtland, in the county of Lake and State of Ohio, have invented a certain new and Improved Potato-Digger, Ground-Pulverizer, and Rake Combined; and we do hereby declare that the following is a full, clear, and complete description thereof, reference being had to the accompanying drawing making part of the same.

Figure 1:
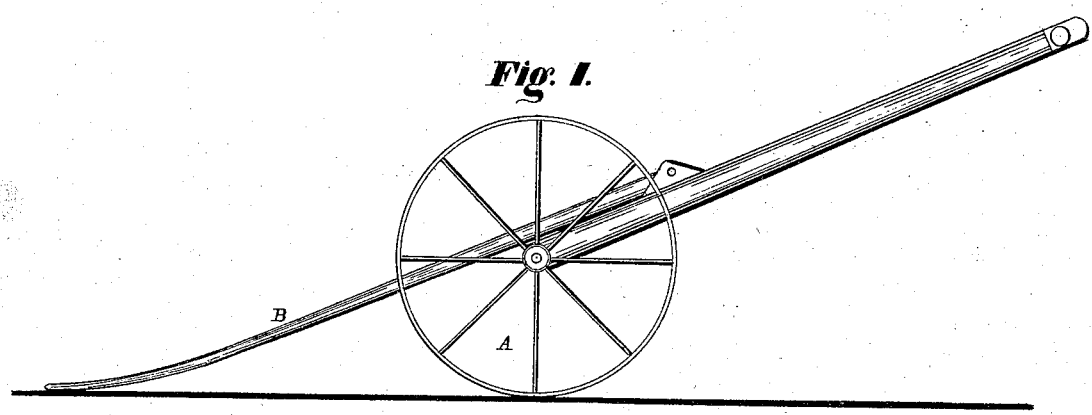
Figure 2:
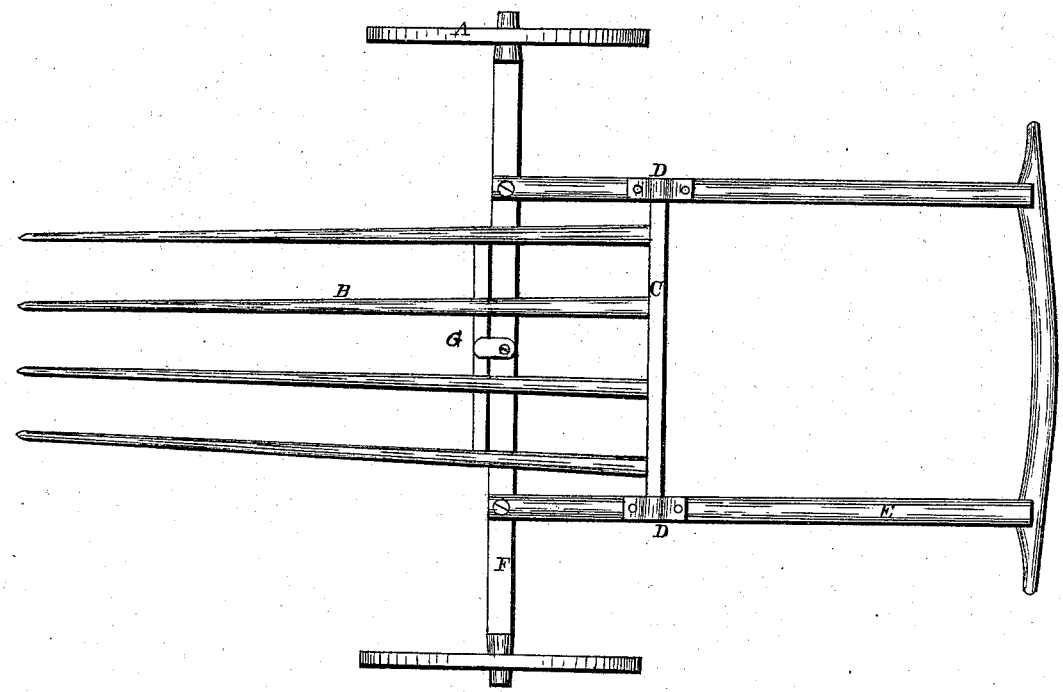

Figure 1 is a side view of the implement. Fig. 2 is a plan view.

Like letters of reference refer to like parts in the several views.

The nature of this invention relates to an implement for digging potatoes, and which also may be used in the capacity of a harrow for stirring the ground, and also used for raking up grain in the swath for binding.

Of the construction and operation of the above-specified implement the following is a more full and complete description.

The abovesaid implement consists of a pair of wheels, A, on which is mounted the rake B. The head C thereof is hinged at D to the arms or handles E, whereby the implement is driven. The arms are secured to the axle-tree F in a rigid manner, whereas the rake lies loosely thereon, as shown; hence, the rake is free to move independently of the axle-tree and of the movement of the arms for a purpose presently shown.

This implement, as above described, is for the several purposes of digging potatoes, agitating the soil, and for raking up grain for binding.

The implement, when employed for digging potatoes, is used in the position shown in the drawing. The rake is made fast to the axle-tree in a rigid manner by means of a clamp, G, or other suitable device. The implement is then pushed forward and the teeth of the rake forced into the ground under the hill of potatoes, which is then elevated by depressing the handles, thereby lifting the potatoes and dirt from the ground. When thus elevated the dirt falls through the teeth of the rake, leaving the potatoes clean therefrom, and which may be taken at once from the rake or dropped upon the surface of the ground to be picked up at leisure.

In using the implement for gathering grain the rake is loosened from its rigid connection with the axle-tree, and is allowed to lie free thereon, while the extreme ends of the teeth rest upon the ground, as shown in Fig. 1. The implement is then pushed forward. The teeth run under the swath. The grain in consequence slides upward upon the incline of the rake toward the operator, who, when a sufficient quantity has gathered thereon for a bundle, elevates it by depressing the handles, thereby bringing the grain within easy reach of the binder, who ties it up without stooping for that purpose.

In consequence of the rake being hinged to the handles, as above described, it readily adjusts itself to uneven ground while running along under the swath of grain, and is, therefore, not liable to be caught in roots, tufts of grass, dirt, &c., as it is free to move over them, and thereby escapes being broken or otherwise injured.

In order to use the implement for stirring the ground in the capacity of a rake or harrow it is inverted. The rake is also made fast to the axle-tree, and is then drawn along over the ground, instead of being pushed forward, as in the former instances. The implement, when used for this latter purpose, is weighted more or less as the depth that the ground to be stirred may require.

Claim.

What we claim as our invention, and desire to secure by Letters Patent, is—

The herein-described implement, consisting of the adjustable rake B, hinged as described, arms E, axle-tree F, and wheels A, all constructed to operate substantially in the manner as and for the purposes specified.

SILAS BIGELOW.
LEANDER C. BIGELOW.

Witnesses:
W. H. BURRIDGE,
H. P. HARMON.